United States Patent
Yueh et al.

(10) Patent No.: US 10,296,505 B2
(45) Date of Patent: May 21, 2019

(54) FRAMEWORK FOR JOINING DATASETS

(71) Applicant: SAP SE, Walldorf (DE)

(72) Inventors: Chien Ming Yueh, Castro Valley, CA (US); Jaqueline Pollak, Werder/Havel (DE); Vei Ming Seah, Cupertino, CA (US)

(73) Assignee: SAP SE, Walldorf (DE)

( * ) Notice: Subject to any disclaimer, the term of this patent is extended or adjusted under 35 U.S.C. 154(b) by 543 days.

(21) Appl. No.: 14/985,298

(22) Filed: Dec. 30, 2015

(65) Prior Publication Data

US 2017/0193036 A1    Jul. 6, 2017

(51) Int. Cl.
*G06F 17/30* (2006.01)
*G06F 16/242* (2019.01)
*G06F 3/0482* (2013.01)
*G06F 16/2455* (2019.01)

(52) U.S. Cl.
CPC ........ *G06F 16/2428* (2019.01); *G06F 3/0482* (2013.01); *G06F 16/242* (2019.01); *G06F 16/2456* (2019.01); *G06F 17/30398* (2013.01); *G06F 17/30498* (2013.01)

(58) Field of Classification Search
CPC .................................. G06F 17/30398
See application file for complete search history.

(56) References Cited

PUBLICATIONS

Dundas. "Introduction to Data Cubes." YouTube, published Nov. 10, 2014, uploaded Nov. 3, 2014. https://www.youtube.com/watch?v=axCPzB_baL8 (Year: 2014).*

* cited by examiner

*Primary Examiner* — Syed H Hasan
(74) *Attorney, Agent, or Firm* — Klarquist Sparkman, LLP

(57) ABSTRACT

Described herein is a framework to facilitate joining datasets. In accordance with one aspect of the framework, a join request is received from a user interface. The join request may include identifiers for first and second input datasets, as well as one or more join parameters. The join request is automatically converted into a query command based on a query language. The query command is executed to generate an output dataset. An output response including the output dataset may then be sent to the user interface for display.

20 Claims, 18 Drawing Sheets

Table EMPLOYEES: 102

| ID | NAME | REG_ID | DEPARTMENT_ID |
|---|---|---|---|
| 1 | Moe | 1 | D1 |
| 2 | Larry | 2 | D1 |
| 3 | Curly | 1 | D1 |
| 4 | Shemp | 2 | D3 |

Table DEPARTMENTS: 104

| ID | NAME |
|---|---|
| D1 | Sales |
| D2 | Accounting |
| D3 | Facilities |

Table REGIONS: 106

| ID | NAME | PROVIDER_ID |
|---|---|---|
| 1 | West | 11 |
| 2 | North | 12 |
| 3 | East | 13 |
| 4 | South | 14 |

Table HMOS: 108

| ID | NAME |
|---|---|
| 11 | Kaiser |
| 12 | Aetna |
| 13 | Blue Shield |
| 14 | Cigna |

*Fig. 1*

```
select T1.EMPLOYEE_NAME, T1.DEPARTMENT_NAME, T2.REGION_NAME, T2.HMO_NAME
from (
  select E.NAME as EMPLOYEE_NAME, E.REG_ID, D.NAME as DEPARTMENT_NAME
  from EMPLOYEES E
  inner join DEPARTMENTS D
  on E.DEPARTMENT_ID = D.ID
) as T1
inner join (
  select R.NAME as REGION_NAME, R.ID, H.NAME as HMO_NAME
  from REGIONS R
  inner join HMOS H
  on R.PROVIDER_ID = H.ID
) as T2
on T1.REG_ID = T2.ID
```

*Fig. 2a*

| EMPLOYEE_NAME | DEPARTMENT_NAME | REGION_NAME | HMO_NAME |
|---|---|---|---|
| Moe | Sales | West | Kaiser |
| Larry | Sales | North | Aetna |
| Curly | Sales | West | Kaiser |
| Shemp | Facilities | North | Aetna |

*Fig. 2b*

| Define Join Conditions | Select Output Columns | | 706 | | | 702 Available Columns |
|---|---|---|---|---|---|---|
| 4 of 4 Rows | | | | | | 6 Columns |
| ID | NAME | REG_ID | DEPARTMENT_ID | ID_1 | NAME_1 | Available Columns |
| 1 | Moe | 1 | D1 | D1 | Sales | ☑ ID |
| 2 | Larry | 2 | D1 | D1 | Sales | ☑ NAME |
| 3 | Curly | 1 | D1 | D1 | Sales | ☑ REG_ID |
| 4 | Shemp | 2 | D3 | D3 | Facilities | ☑ DEPARTMENT_ID |
| | | | | | | ☑ ID_1 |
| | | | | | | ☑ NAME_1 |

*Fig. 7*

| Table A | | 902 |
|---|---|---|
| DEPARTMENT_ID | NAME | |
| 1 | Smith | |
| 2 | Jones | |

| Table B | | 904 |
|---|---|---|
| DEPARTMENT_ID | REGION | |
| 2 | USA | |
| 3 | CANADA | |

| A INNER JOIN B, Join condition: A.DEPARTMENT_ID = B.DEPARTMENT_ID: score = ½ → 50% | | | |
|---|---|---|---|
| A.DEPARTMENT_ID | A.NAME | B.DEPARTMENT_ID | B.REGION |
| 2 | Jones | 2 | USA |

906

| A LEFT OUTER JOIN B, Join condition: A.DEPARTMENT_ID = B.DEPARTMENT_ID: score = ½ → 50% | | | |
|---|---|---|---|
| A.DEPARTMENT_ID | A.NAME | B.DEPARTMENT_ID | B.REGION |
| 1 | Smith | Null | Null |
| 2 | Jones | 2 | USA |

908

| A FULL OUTER JOIN B, Join condition: A.DEPARTMENT_ID = B.DEPARTMENT_ID: score = 1/3 → 33.3% | | | |
|---|---|---|---|
| A.DEPARTMENT_ID | A.NAME | B.DEPARTMENT_ID | B.REGION |
| 1 | Smith | Null | Null |
| 2 | Jones | 2 | USA |
| Null | Null | 3 | CANADA |

```
{
joinType: INNER,
objectType: joinDefinition,
outputColumns: null,
source: {
  name: EMPLOYEES,
  objectType: worksheet
}
target: {
  name: DEPARTMENTS,
  objectType: worksheet
}
}
```

```
{
  "results": {
    "source": {
      "name": "EMPLOYEES",
      "columns": [
        {
          "name": "ID",
          "origname": "ID",
          "origid": 27853,
          "origin": "source"
        },
        // ...more columns from
EMPLOYEES
      ]
    },
    "target": {
      "name": "DEPARTMENTS",
      "columns": [
        {
          "name": "ID",
          "origname": "ID",
          "origid": 27857,
          "origin": "target"
        },
        // ...more columns from
DEPARTMENTS
      ]
    },
    "columns": [
      {
        "id": 29019,
        "name": "ID",
      },
      // ...more output columns from the
join
    ],
    "suggestion": {
      "joinType": "INNER",
      "joinColumns": [
        {
          "source": {
            "name": "DEPARTMENT_ID",
          },
          "target": {
            "name": "ID",
          },
          "joinScore": 100,
        },
        {
          "source": {
            "name": "NAME",
          },
          "target": {
            "name": "NAME",
          },
          "joinScore": 0,
        },
        {
          "source": {
            "name": "NAME",
          },
```
⎯ 1102a

```
          "target": {
            "name": "ID",
          },
          "joinScore": 0,
        },
        {
          "source": {
            "name": "DEPARTMENT_ID",
          },
          "target": {
            "name": "NAME",
          },
          "joinScore": 0,
        }
      ],
    },
    "id": 2903,
    "joinColumns": [
      {
        "sourceColumnName":
"DEPARTMENT_ID",
        "targetColumnName": "ID"
      }
    ],
    "data": [
      {
        "29019": "1",
        "29020": "Moe",
        "29021": "1",
        "29022": "D1",
        "29023": "D1",
        "29024": "Sales"
      },
      // ...more sample data
    ],
    "rows": 4,
    "joinScore": 100
  }
}
```
⎯ 1102b

*Fig. 11*

```
{
  joinType: INNER,
  objectType: joinDefinition,
  outputColumns: null,
  source: {
    joinType: INNER,
    joinCondition: [
      {
        sourceColumnName:
"DEPARTMENT_ID",
        targetColumnName: "ID"
      }
    ],
    objectType: joinDefinition,
    outputColumns: [
      {
        name: "ID",
        origname: "ID",
        origin: "source"
      },
      {
        name: "NAME",
        origname: "NAME",
        origin: "source"
      },
      {
        name: "REG_ID",
        origname: "REG_ID",
        origin: "source"
      },
      {
        name: "DEPARTMENT_ID",
        origname: "DEPARTMENT_ID",
        origin: "source"
      },
      {
        name: "ID_1",
        origname: "ID_1",
        origin: "target"
      },
      {
        name: "NAME_1",
        origname: "NAME_1",
        origin: "target"
      },
    ],
    source: {
      name: EMPLOYEES,
      objectType: worksheet
    }
    target: {
      name: DEPARTMENTS,
      objectType: worksheet
    }
  },
  target: {
    name: REGIONS,
    objectType: worksheet
  }
}
```
← 1402

*Fig. 14*

| Define Join Conditions | Select Output Columns | | | | |
|---|---|---|---|---|---|
| 4 of 4 Rows | | | | | 11 Columns |
| ID | NAME | REG_ID | DEPARTMENT_ID | ID_1 | Available Columns |
| 1 | Moe | 1 | D1 | D1 | ☑ ID |
| 2 | Larry | 2 | D1 | D1 | ☑ NAME |
| 3 | Curly | 1 | D1 | D1 | ☑ REG_ID |
| 4 | Shemp | 2 | D3 | D3 | ☑ DEPARTMENT_ID |
| | | | | | ☑ ID_1 |
| | | | | | ☑ NAME_1 |
| | | | | | ☑ ID_2 |
| | | | | | ☑ NAME_2 |
| | | | | | ☑ PROVIDER_ID |
| | | | | | ☑ ID_1_1 |
| | | | | | ☑ NAME_1_1 |

*Fig. 16*

| Define Join Conditions | Select Output Columns | | | | |
|---|---|---|---|---|---|
| 4 of 4 Rows | | | | 11 Columns | |
| NAME | NAME_1 | NAME_2 | NAME_1_1 | Available Columns | |
| Moe | Sales | West | Kaiser | ☐ | ID |
| Larry | Sales | North | Aetna | ☑ | EMPLOYEE_NAME |
| Curly | Sales | West | Kaiser | ☐ | REG_ID |
| Shemp | Facilities | North | Aetna | ☐ | DEPARTMENT_ID |
| | | | | ☐ | ID_1 |
| | | | | ☑ | DEPARTMENT_NA |
| | | | | ☐ | ID_2 |
| | | | | ☑ | REGION_NAME |
| | | | | ☐ | PROVIDER_ID |
| | | | | ☑ | ID_1_1 |
| | | | | ☑ | HMO_NAME |

*Fig. 17a*

| Define Join Conditions | Select Output Columns | | | | |
|---|---|---|---|---|---|
| 4 of 4 Rows | | | | 11 Columns | |
| EMPLOYEE_NAME | DEPARTMENT_NA... | REGION_NAME | HMO_NAME | Available Columns | |
| Moe | Sales | West | Kaiser | ☐ | ID |
| Larry | Sales | North | Aetna | ☑ | EMPLOYEE_NAME |
| Curly | Sales | West | Kaiser | ☐ | REG_ID |
| Shemp | Facilities | North | Aetna | ☐ | DEPARTMENT_ID |
| | | | | ☐ | ID_1 |
| | | | | ☑ | DEPARTMENT_NA |
| | | | | ☐ | ID_2 |
| | | | | ☑ | REGION_NAME |
| | | | | ☐ | PROVIDER_ID |
| | | | | ☑ | ID_1_1 |
| | | | | ☑ | HMO_NAME |

*Fig. 17b*

FRAMEWORK FOR JOINING DATASETS

TECHNICAL FIELD

The present disclosure relates generally to computer systems, and more specifically, to a framework for joining datasets.

BACKGROUND

A relational database is a digital database that is organized based on the relational model of data. Relational databases store data efficiently by requiring the data to be organized into various tables, each of which is a collection of related data. A dataset may be a data matrix where every row corresponds to a record (or member) of the dataset, and every column represents a particular attribute of that record. The dataset usually corresponds to the contents of a single database table, or the result of a database operation that creates a table.

In order to retrieve a dataset that combines information from various tables, one has to define a "join" that specifies the relationship among the data in these tables. A "join" is a database operation that combines records from exactly two datasets to create an output dataset. A "sub-join" is a join whose result is used in another join. A "sub-join" itself can also be a complex join. A "complex join" is a join with at least one sub-join. More particularly, a complex join is a join where one or both of the input datasets come from a sub-join.

Structured Query Language (SQL) is a special-purpose programming language that is commonly used for managing data held in a relational database management system (RDBMS). SQL is one of the most widely-supported way of manipulating datasets in RDBMS. Defining a join is a complicated effort that requires advanced knowledge of SQL, the tables, data and relationships of the database to express the definition. This difficulty increases as the number of tables and columns increase.

Therefore, there is a need for an improved framework that addresses the above-mentioned challenges.

SUMMARY

A framework for facilitating joining of datasets is described herein. In accordance with one aspect of the framework, a join request is received from a user interface. The join request may include identifiers for first and second input datasets, as well as one or more join parameters. The join request is automatically converted into a query command based on a query language. The query command is executed to generate an output dataset. An output response including the output dataset may then be sent to the user interface for display.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 1 shows exemplary tables of a relational database;
FIG. 2a shows an exemplary SQL statement to build a dataset;
FIG. 2b shows an exemplary output table generated by the SQL statement;
FIG. 7 shows an exemplary output editor;
FIG. 9 illustrates match scores obtained for different types of joins;
FIG. 11 shows an exemplary output response;
FIG. 14 shows an exemplary join request;
FIG. 16 shows another exemplary output editor;
FIG. 17a shows the current output dataset with four selected columns;
FIG. 17b shows the current output dataset with renamed columns.

DETAILED DESCRIPTION

Figure 3:
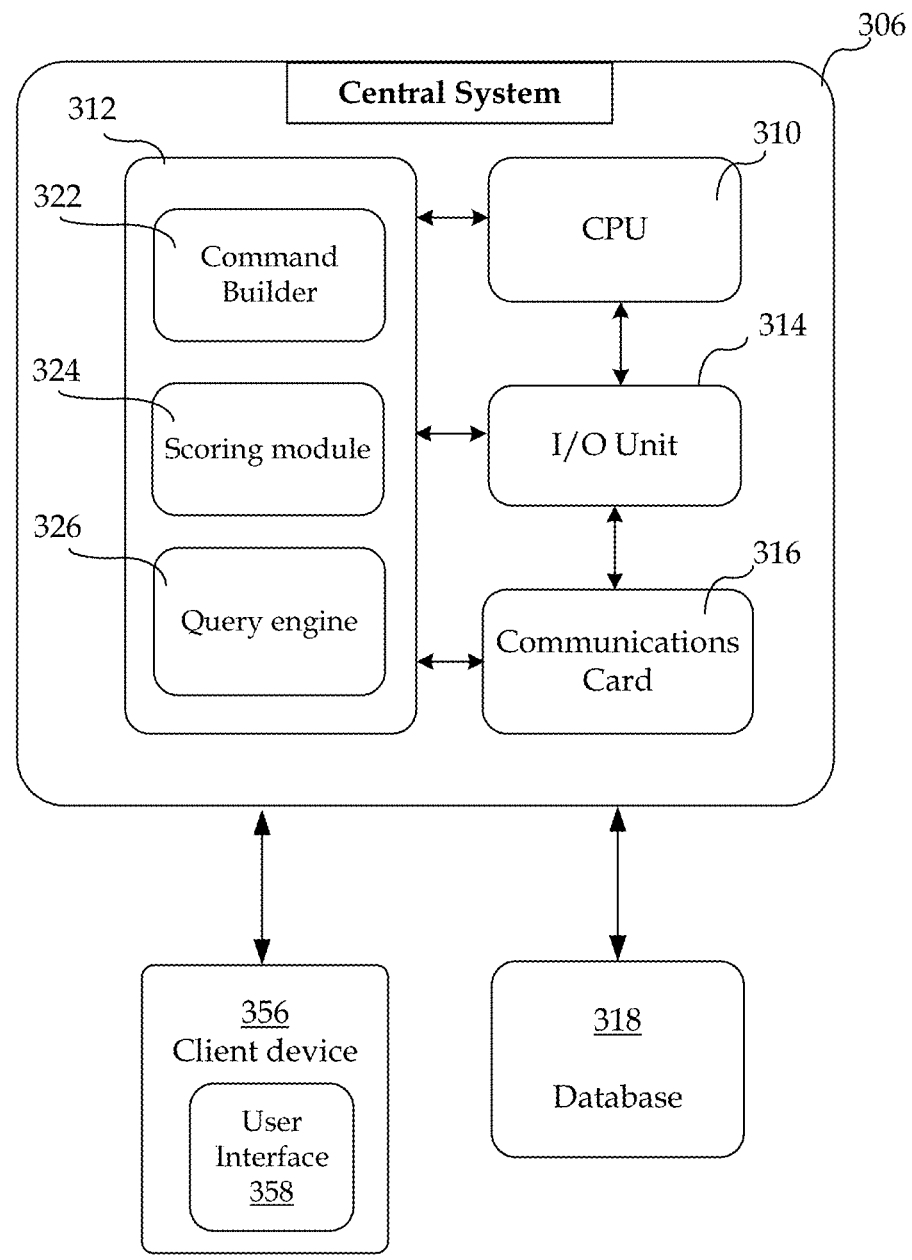
FIG. 3 is a block diagram illustrating an exemplary architecture.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

FIG. 1 shows exemplary tables of a relational database. More particularly, an EMPLOYEES table 102, a DEPARTMENTS table 104, a REGIONS table 106 and a Health Maintenance Organizations (HMOS) table 108 are shown. A user named. Becky is interested in compiling employee data. Her task is to build a dataset that shows the region, department and HMO provider for each employee. The information that Becky is looking for is contained entirely within the database tables (102, 104, 106 and 108).

However, it is difficult to build a dataset that combines data from various tables. For Becky to complete her task in a typical relational database system that uses SQL, she is required to know the following: (1) how the data is organized; (2) what the names of each table (or dataset) are; (3) what columns (or data attributes) are in each table; (4) which columns can be used to join with another table; (5) how to shape the complex SQL join tree to eventually output the desired data; (6) how to express the combination of the joins in a language (e.g., SQL); and (7) whether the resulting dataset is correct and contains the desired information she was looking for.

Without this knowledge, Becky would not be able to write the SQL statement to build her dataset. FIG. 2a shows an exemplary SQL statement 202 that she would need to write to build her dataset, and FIG. 2b shows an exemplary output table 204 generated by the SQL statement 202. There are variations of the SQL statement 202 to solve Becky's problem, but they all require the same knowledge about the database.

The present framework provides tools to build a join statement (e.g., complex join) without requiring the user to have a deep knowledge of the database or the query language (e.g., SQL). One aspect of the present framework provides a collection of user interface (UI) views (or screens) that enables the user to construct the desired dataset without knowledge of the aforementioned topics (1) to (7). The UI views may be arranged to display various database tables and their contents, present a list of join possibilities and their results, and enable the user to define a complicated join without memorizing SQL syntax.

The server may select a number of columns from each dataset and calculate a "score" representing the quantity of matched records in response to those columns being used as the join condition. The server may convert the join parameters to meaningful query commands conforming to a query language (e.g., SQL), and execute the query commands on a database management system (e.g., RDBMS). The server may further capture and process the results of the query commands, and send the results back to the UI for display. The server may also send back a list of paired columns with their corresponding scores. The response from the server to the UI presents the resulting dataset based on the join parameters the user provided (or default values if the parameters were not provided). In addition, the response may also include a score for the current join condition, and additional scores for other join conditions that the user may wish to consider. These and other exemplary features and advantages will be described in more details herein.

It should be appreciated that the framework described herein may be implemented as a method, a computer-controlled apparatus, a computer process, a computing system, or as an article of manufacture such as a computer-usable medium. For illustration purposes, the present framework may be described in the context of structured query language (SQL). It should be appreciated, however, that the present framework may also be applied to other types of languages.

FIG. 3 is a block diagram illustrating an exemplary architecture 300 that may be used to implement the framework described herein. Generally, architecture 300 may include a central computer system 306, a client device 356, user interface 358 and a data repository 318. Central computer system 306 may include a processor or central processing unit (CPU) 310, an input/output (I/O) unit 314, a memory module 312 and a communications card or device 316 (e.g., modem and/or network adapter) for exchanging data with a network (e.g., local area network (LAN) or a wide area network (WAN)). It should be appreciated that the different components and sub-components of the computer system 306 may be located on different machines or systems.

Central computer system 306 may be communicatively coupled to one or more other computer systems or devices via the network. For instance, computer system 306 may further be communicatively coupled to one or more databases 318. Alternatively, database 318 may be implemented within computer system 306. Database 318 may be, for example, a relational database.

Memory module 312 of the central computer system 306 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. Memory module 312 serves to store machine-executable instructions, data, and various software components for implementing the techniques described herein, all of which may be processed by CPU 310. Alternatively, the various techniques described herein may be implemented as part of a software product. Each computer program may be implemented in a high-level procedural or object-oriented programming language e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 312 includes a command builder 322, a scoring module 324 and a query engine 326. Command builder 322 may include a set of function modules or programs designed to construct query commands (or statements). Scoring module 324 may include a set of function modules or programs designed to generate match scores that represent the quantity of matched records. Query engine 326 may include a set of function models or programs designed to execute query commands on database 318.

Central computer system 306 may act as a server and operate in a networked environment using logical connections to one or more client devices 356. Client device 356 may include a user interface 358 to display views to enable a user to send and receive information (e.g., query parameters, query results, etc.) from computer system 306.

Figure 4:
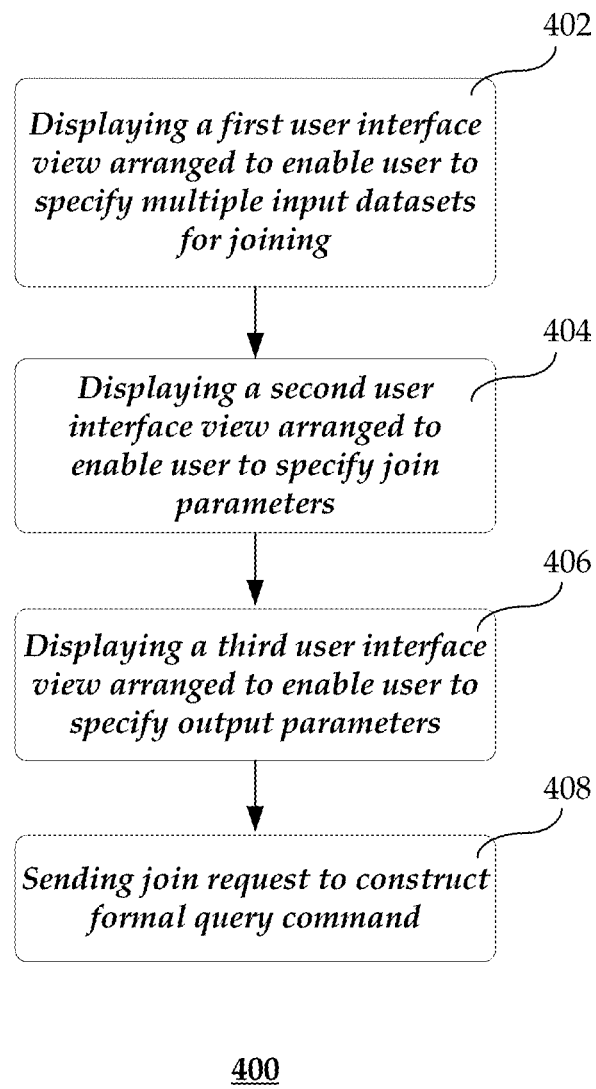
FIG. 4 shows an exemplary method of editing a query command.

FIG. 4 shows an exemplary method 400 of editing a query command. The method 400 may be performed automatically or semi-automatically by the central computer system 306, as previously described with reference to FIG. 3. It should be noted that in the following discussion, reference will be made, using like numerals, to the features described in FIG. 3.

At 402, user interface 358 displays a first user interface view arranged to enable a user to specify multiple input datasets for joining. In a relational database management system (RIMS), for example, a join operation is used to combine two input datasets at a time. Each input dataset may be a table, or the resulting output dataset of another join operation performed between two tables. To combine data from more than two datasets, the third dataset may be joined to the result of the first join. In this scenario, there are a total of two join operations. To join four datasets, there will be three join operations. In general, combining data from n datasets require (n−1) joins. When there are two or more joins, there may more than one execution sequence of these joins. Depending on how the datasets are structured and what the user wants, the joins are executed in a particular way to obtain the desired results.

Figure 5A:
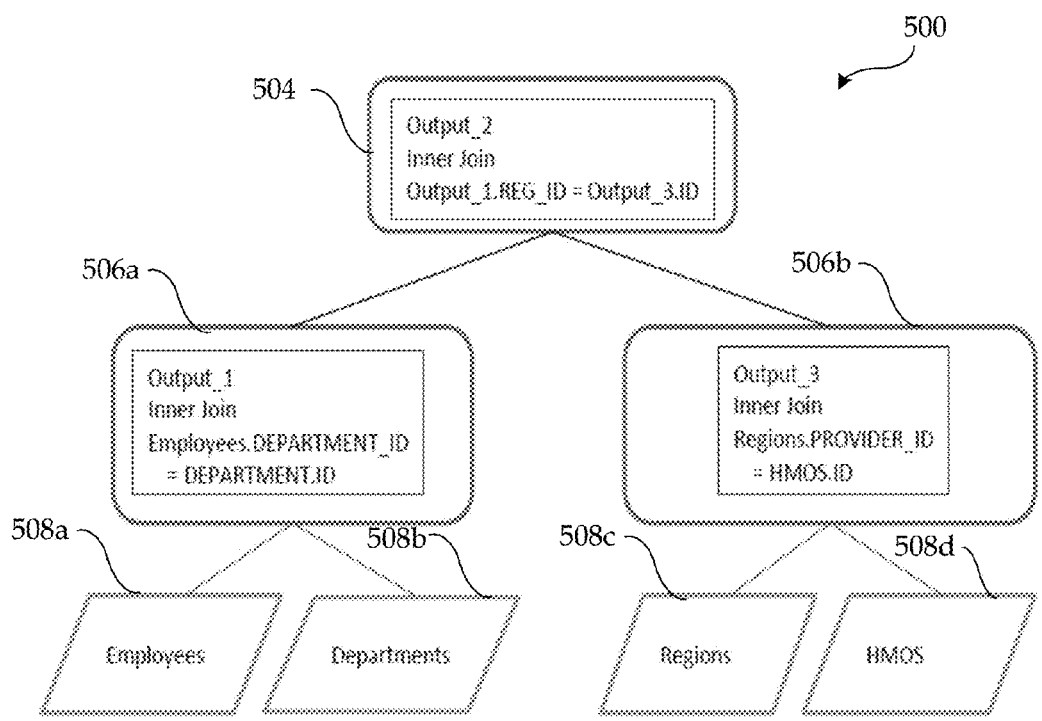
FIG. 5a shows an exemplary join diagram.

The first user interface view may be arranged to display a "Join Diagram" to represent the arrangement of these join operations as a full binary tree. A full binary tree generally refers to a tree data structure in which every node in the tree has either 0 or 2 children. FIG. 5a shows an exemplary join diagram 500. The join diagram 500 is a tree representation of the exemplary SQL query statement shown in FIG. 2a. Each internal (or non-leaf) node (504, 506a-h) of the join diagram 500 represents a join operation between the child nodes, while the leaf nodes (508a-d) represent input datasets (or tables).

As shown, there are a total of three join operations: 2 sub-joins (506a and 506b) and 1 final complex join (504). Each join operation is assigned a name (Output_1, Output_1 and Output_3). Since each join operation creates a dataset, these names may be used to refer to both the join operation and the resulting dataset. The sub-join Output_1 (506a) combines input datasets (or tables) Employees (508a) and Departments (508b), while the sub-join Output_3 (506b) combines input datasets (or tables) Regions (508c) and HMOS (508d).

Figure 5B:
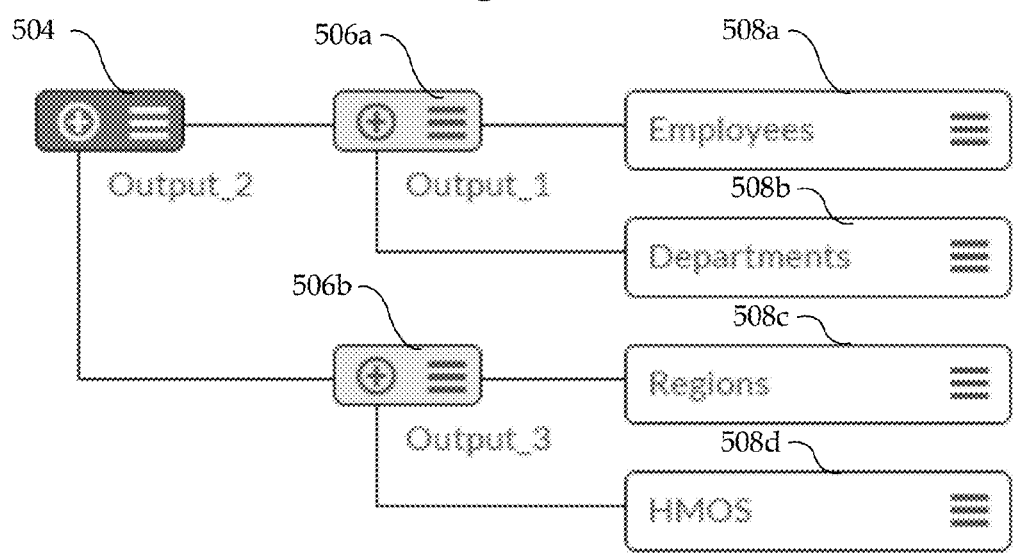
FIG. 5b shows an alternate representation of the join diagram.

FIG. 5b shows an alternate representation of the join diagram. The first user interface view may be arranged to enable a user to build the join diagram whereby the user may select a table (e.g., Employees, Departments, Regions or HMOS) and connect it to another table to create a join operation (e.g., Output_1 or Output_3). The user may subsequently connect the join to another table, or to another join to generate another join operation (e.g., Output_2). As shown, Employees (508a) is joined with Departments (508b) to create Output_1 (506a), Regions (508c) is joined with HMOS (508d) to create Output_3 (506b), and the results of both are joined to create Output_2 (504). The user can add or remove nodes from this tree to express the join operation, its datasets, and the join sequence.

The first user interface view displays the contents of each dataset in response to the user selecting (e.g., clicking or touching) the associated node. For example, when user selects the Employees, Departments, Regions or HMOS node, contents of the selected table are displayed in, for example, a Table Viewer. This allows the user to verify whether the selected table is the desired dataset. If not, the first user interface view allows her to replace the table at the node with another table. When the user selects the Output_1, Output_2 or Output_3 node, the first user interface view displays join parameters at that node in a second user interface view and the output of the join as defined by the join parameters in a third user interface view. This enables the user to incrementally gauge, at each sub-join, whether she is building the correct final join to obtain the desired dataset at the end.

Returning to FIG. 4, at 404, user interface 358 displays a second user interface view arranged to enable the user to specify join parameters. The second user interface view may be arranged to display a join editor that enables a user to specify join parameters. Every join operation may be associated with join parameters that specify how to carry out the join. Join parameters may include a join type and a join condition.

The join type may be, for example, inner, left outer or full outer. An inner join requires each record in the two joined input tables to have matching records. An inner join creates a new result table by comparing each row of first input table with each row of second input table to find all pairs of rows which satisfy the join condition. The result of a left outer join for first and second input tables always contains all records of first table ("left"), even if the join-condition does not find any matching record in the other table ("right"). A full outer join can contain the same or even more records than the left outer join. It contains all records of the first input table as well as all records of the second input table. Where records in the full outer join tables do not match, the resulting set will have NULL values for every column of the table that lacks a matching row.

The join condition refers to a set of conditional equations (or pairs of columns) that specify how data in one table relates to data in another table (e.g., EMPLOYEES.DEPARTMENT_ID=DEPARTMENT.ID). A join condition can have more than one conditional equation, all of which must be true for the relationship to be satisfied.

Figure 6A:
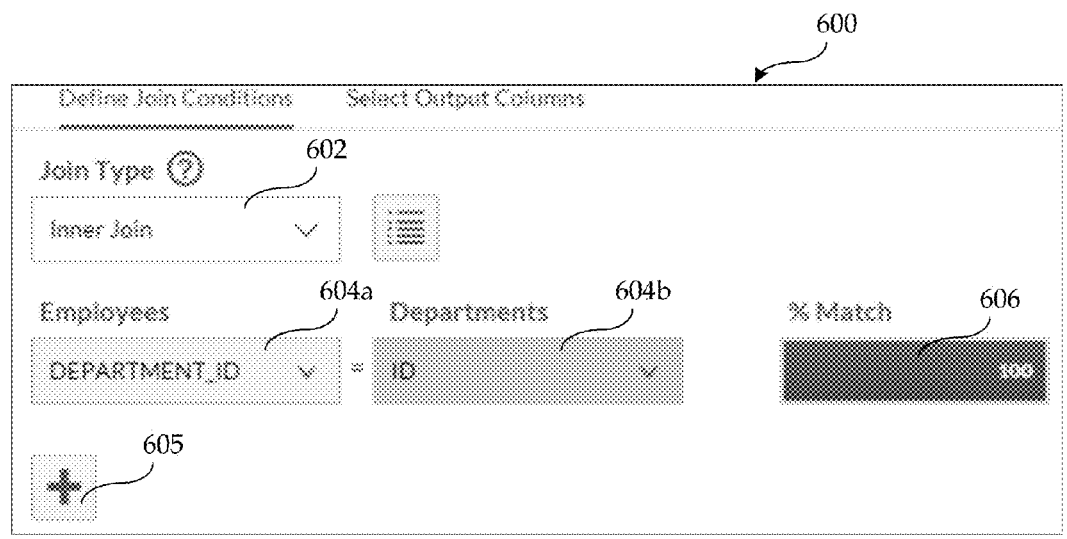
FIG. 6a shows an exemplary join editor.

FIG. 6a shows an exemplary join editor 600. For every join, the second user interface view displays a join editor 600 that enables the user to specify the join parameters. As shown, the join editor 600 may include user interface elements (e.g., drop-down menus, text box, etc.) for specifying join type 602 and join conditions (604a-b). To specify the join condition, the user does not have to remember which columns exist in each table, because each join condition UI element (604a or b) displays a list of all available columns for each table (e.g., Employees or Departments) for the user to select. The user may insert further join conditions by selecting a user element 605. In addition, when the user selects a column, the join editor 600 displays a "score" 606 of how many records from the first table (e.g., Employees) have matches in the second table (e.g., Departments). The score represents how well the first and second tables are related. The score may be expressed in, for example, a percentage.

Figure 6B:
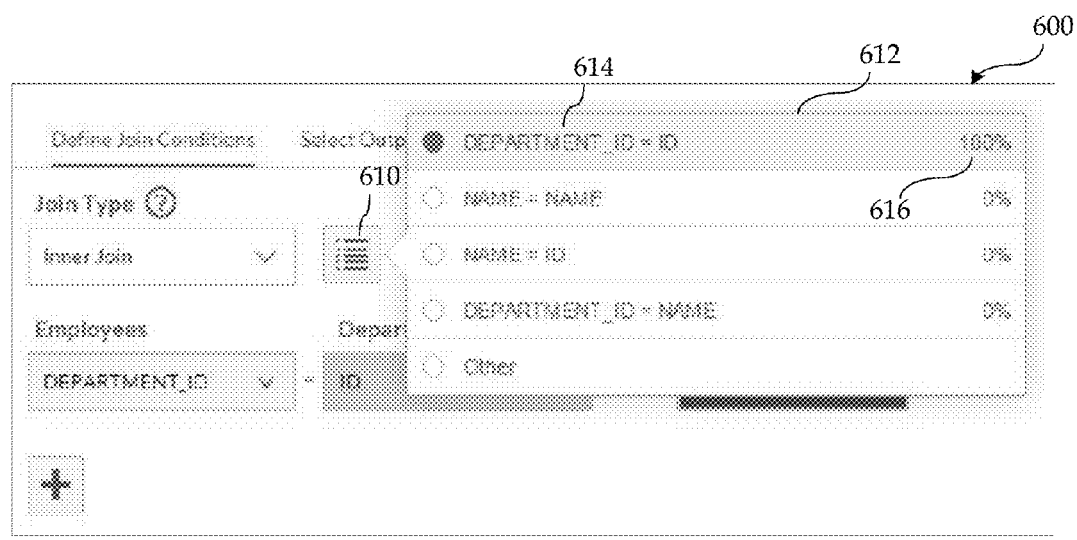
FIG. 6b shows another exemplary join editor.

The join editor 600 may exhibit other behaviors that help the user select the proper join condition to obtain the desired results. FIG. 6b shows an exemplary join editor 600 that exhibits these other behaviors. In response to the user selecting user interface element 610 (e.g., list button), a list 612 of candidate join conditions 614 with respective match scores 616 is displayed. The user may then select from the list 612 the appropriate candidate join condition 614 to use. With this list 612, the user sees a set of "what-if" that show the match scores 616 for corresponding candidate join conditions 614. If the user does not already know which join condition to use, this list helps the user select the right join condition by showing the score for each one, without requiring the user to manually select a column from each table.

As the user changes the join parameters, the third user interface view may display the results of the join operation using those join parameters. This behavior provides continuous and instant feedback about the effects of the join parameters on the resulting dataset and how well they connect the two input tables.

Returning to FIG. 4, at 406, user interface 358 displays a third user interface view arranged to enable the user to specify output parameters. Output parameters may include, for example, the names of columns in the output dataset resulting from the join operation. The third user interface view may be arranged to display an output editor to enable the user to select the desired output columns. This may be necessary because the user typically does not want to carry over every column for the input datasets. Usually, the user wants only certain columns in the output dataset schema.

FIG. 7 shows an exemplary output editor 700. The output editor 700 displays a list 702 of all available input columns with a checkbox 705 next to each column name for user selection. If both input tables have columns with the same name the second instance of that name may be automatically renamed to avoid duplicate name problems. For example, both tables EMPLOYEES and DEPARTMENTS have columns named ID and NAME, which is allowed because they are separate tables. However, if the user joins these two input tables, the second set of columns are automatically renamed as ID_1 and NAME_1 to avoid conflicts in naming. This is because column names in a dataset must be unique. The user may also arbitrarily rename columns. For example, if an existing input column has the cryptic name "EMPLNM", the user may rename the column to "EMPLOYEE_NAME" for the join output.

In some implementations, the output editor 700 displays the results of the join operation in table 706. Values of rows in the output dataset corresponding to the selected columns are displayed in table 706. As the user changes the join parameters in the join editor 600, the output editor 700 dynamically changes to display a "live" view 700 of the output dataset created by the join operation with the current join parameters.

Returning to FIG. 4, at 408, user interface 358 generates and sends a join request to the command builder 322 to construct a formal query command (or statement). The user interface 358 may send a join request to the command builder 322 in response to the user modifying or adding join parameters in the join editor 300. The join request may include the following: (1) first input dataset identifier; (2) second input dataset identifier; and (3) one or more join parameters join type and/or join condition) (optional). The first or second input dataset identifier may include the name of the respective table, or a nested parameter structure that specifies another join.

Figure 8:
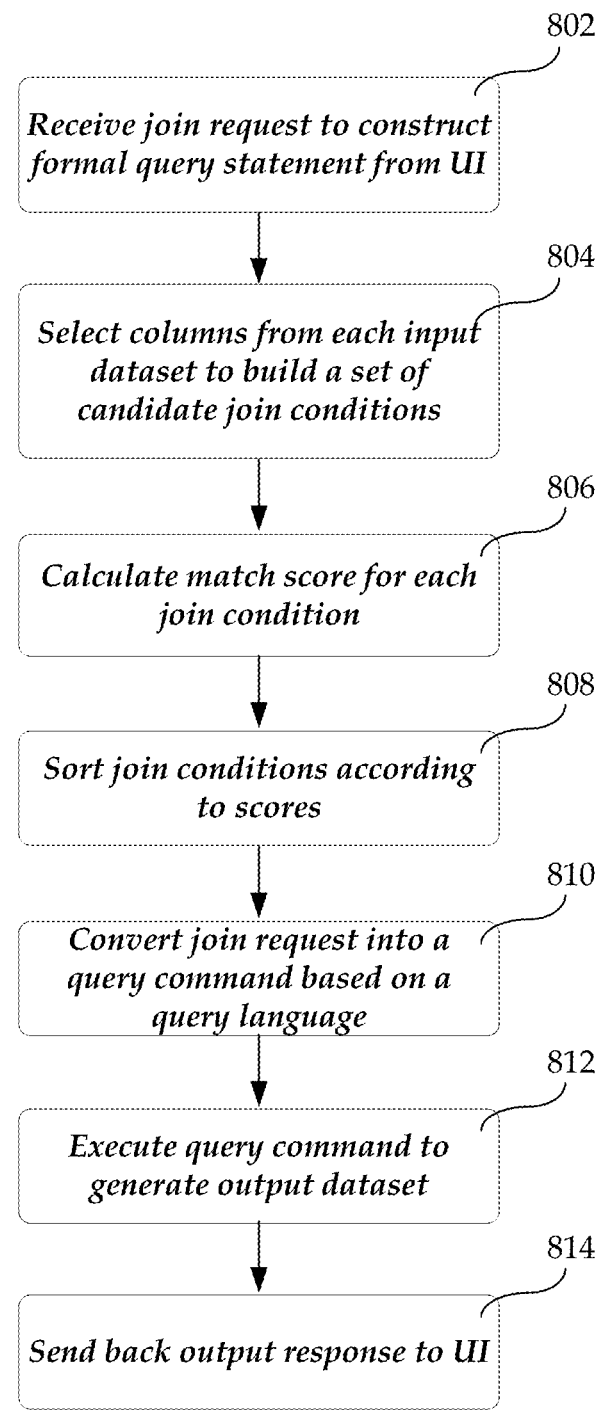
FIG. 8 shows an exemplary method of building a query command.

FIG. 8 shows an exemplary method 800 of building a query command. The method 800 may be performed automatically or semi-automatically by the central computer system 306, as previously described with reference to FIG. 3. It should be noted that in the following discussion, reference will be made, using like numerals, to the features described in FIG. 3.

At 802, command builder 322 receives, from user interface 358, a join request to construct a formal query statement. As discussed previously, the join request may include the first input dataset identifier, the second input dataset identifier and one or more join parameters (e.g., join type and/or join condition). If the join type is not specified in the join request, command builder 322 may assume that the join type is an inner join.

At 804, command builder 322 selects one or more columns from each input dataset to generate one or more candidate join conditions. More particularly, in response to each join request, the command builder 322 may calculate a list of candidate join conditions (i.e., "what-if") and their corresponding match scores. The purpose of this list is to show the user what the score will be if the user chooses one of the other join conditions. These join conditions may have different scores, which can help her decide whether she is using the correct join condition.

Each join condition is a pairing of a first column from the first input dataset (or table) with a second column from the second input dataset (or table). The column pairs may be selected by different methods. In some implementations, the column pairs are selected by selecting, for every column the first table that has a text or integer data type, a predetermined number (e.g., first 5) of columns in the second table that satisfy the following conditions: (a) has the same data type and content type (i.e., entity, such as Person, City, Address Line, Country, Email address, etc.); (b) maximum value in the second column is greater than the minimum value in the first column; and (c) minimum value in the second column is less than the maximum value in the first column. Conditions (b) and (c) ensure that the range of values in the second column overlaps the range of values in the first column. These two conditions do not guarantee that there are common values between the two columns, but they eliminate column pairs that are guaranteed not to have any common values. Command builder 322 assumes that users are more interested in exploring column pairs that can have common values, since common values provide the link to join one table to another.

Additionally, the column pairs are selected by selecting first and second columns with column names ending with a predetermined string (e.g., "id") that indicates that it is most likely that this column is a key for the associated table. Keys are very appropriate to be a good matching candidate. The column pairs may also be selected by selecting first and second columns with column names that satisfy a fuzzy match condition to each other. In this case, "fuzzy match" means that the column names need not match exactly, but match by a predetermined percentage. Further, the column pairs may be selected by selecting first and second columns with column names satisfying a fuzzy match condition to the name of the table. Even further, the column pairs may be selected by selecting column pairs that have previously been used in a join condition.

At 806, command builder 322 may invoke the scoring module 324 to calculate the match score for each join condition. The match score is a measure of how many records from the first (or left) input dataset (or table) appear in the join result. A score of 0% means that no record in the first (or left) dataset matches any record in the second (or right) input dataset. A score of 100% means that every record in the first input dataset has at least one matching record in the second input dataset.

The match score may also be affected by the join type. For example, the match score for an inner join and left outer join may be determined as follows:

$$\text{Match Score} = (\text{Number of matching records in inner join})/(\text{Number of matching records in left outer join})*100\% \quad (1)$$

The match score for a full outer join may be determined as follows:

$$\text{Match Score} = (\text{Number of matching records in inner join})/(\text{Number of matching records in full outer join})*100\% \quad (2)$$

FIG. 9 illustrates the match scores obtained for different types of joins. As shown, the input tables are Table A (902) and Table B (904). The inner join (906) resulted in a match score of 50%, while the left outer join (908) yielded a match score of 50% and the full outer join (910) yielded a match score of 33.3%.

Returning to FIG. 8, at 808, command builder 322 sorts the join conditions according to the match scores. The join conditions may be sorted in, for example, descending order of the match scores.

At 810, command builder 322 converts the join request into a formal query command. The formal query command is constructed according to a syntax of a database query language, such as SQL. If the join request did not specify a join condition, the command builder 322 uses the first candidate join condition with the highest match score (as determined by the previous step 808) as the join condition for the join command.

At 812, command builder 322 invokes query engine 326 to execute the query command to generate the output dataset. Query engine 326 executes the join command and captures the resulting dataset from database 318.

At 814, command builder 322 sends an output response back to user interface 358. In some implementations, the output response includes the following: (1) output dataset values generated by executing the join command; (2) join type used in the join command; (3) join condition used in the join command; (4) list of join conditions where each item specifies a pair of columns and a match score; (5) column information (e.g., name, type) about the output dataset; (6) column information about the first input dataset; and (7) column information about second input dataset.

Figures 10A, 10B:
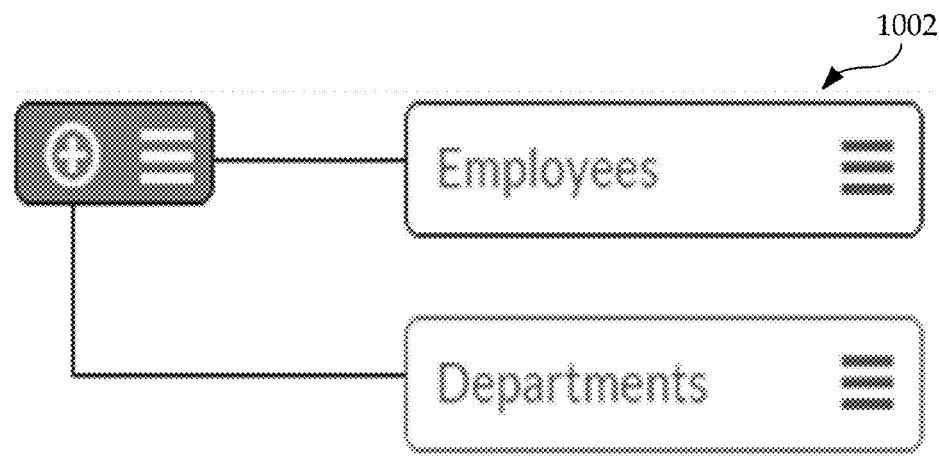
FIG. 10a shows an exemplary join diagram.
FIG. 10b shows an exemplary join request.

The use case for Becky will now be described in the context of the present framework. Becky needs to build a dataset showing a list of employees, and each employee record should show the employees region, department, and HMO provider. Becky starts with two tables she thinks contains data she wants to join: EMPLOYEES and DEPARTMENTS. FIG. 10a shows an exemplary join diagram 1002 that is displayed by the user interface 358 to represent this join. FIG. 10b shows an exemplary join request 1004 that the user interface 358 sends to the command builder 322 to join the two input tables (EMPLOYEES and DEPARTMENTS). As shown, the join request specifies only the input tables, not the join type.

Command builder 322 parses the join request. Since the join request does not specify the join type, command builder 322 uses an inner join as the default join type. Command builder 322 generates a list of "what-if" candidate join conditions and their respective scores, sorts them, and uses the candidate join condition with the highest score to build an SQL join command. Query engine 326 executes this join command and returns the output response, including the resulting output dataset, join parameters used and the "what-if" list, back to user interface 358. FIG. 11 shows an exemplary output response 1102a-b.

Figures 12A, 12B:
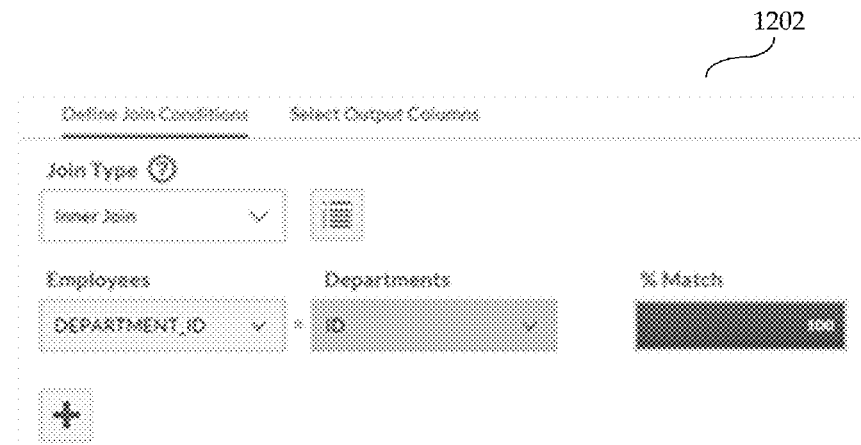
FIG. 12a shows an exemplary join editor that displays the join parameters.
FIG. 12b shows an exemplary output editor that displays the results of the join operation.

User interface 358 receives this output response 1102a-b and displays the join parameters and results to the user. FIG. 12a shows an exemplary join editor 1202 that displays the join parameters. FIG. 12b show an exemplary output editor 1204 that display the results of the join operation.

Becky reviews the result to see whether she has the desired dataset. If not, she can change the join type and join conditions (manually or select one of the pre-calculated join conditions from the "what-if" list). Any changes will generate a join request to the command builder 322 (as in Step 802), and the command builder 322 will return the new dataset resulting from the changes in the join parameters.

Figure 13:
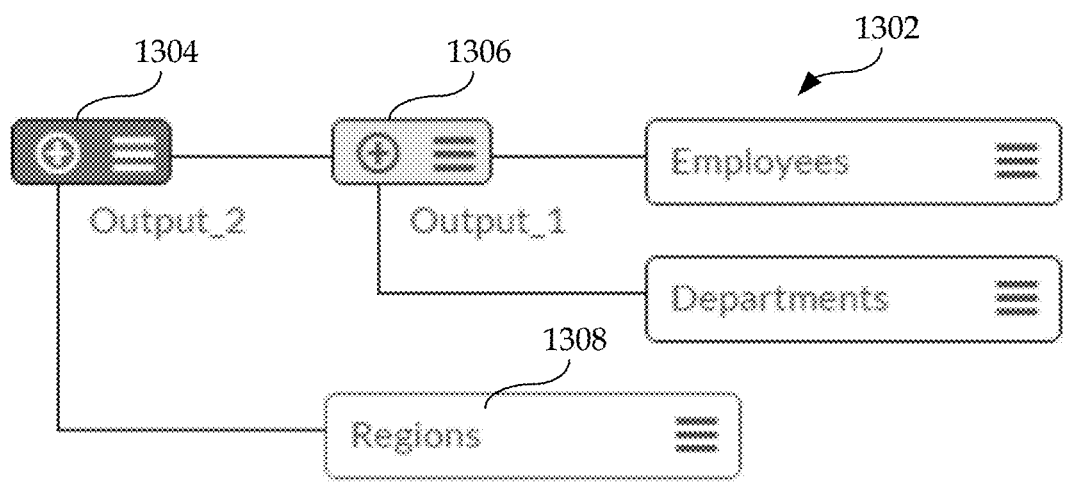
FIG. 13 shows an exemplary join diagram.

Becky may need to join with additional tables to get the desired dataset. FIG. 13 shows an exemplary join diagram 1302 that is displayed by user interface 358. She uses the UI element 1304 to join the previous result 1306 to another table, REGIONS 1308. User interface 358 automatically assigns a temporary name Output_1 to refer to the previous join between EMPLOYEES and DEPARTMENTS. User interface 358 sends a new join request to command builder 322 to join Output_1 with REGIONS. User interface 358 assigns Output_2 as the name for this join. FIG. 14 shows the exemplary new join request 1402.

Figure 15:
FIG. 15 shows an exemplary output editor.

Command builder 322 parses the join request 1402, and generates another list of "what-if" candidate join conditions and their respective scores, sorts them, and uses the candidate join condition with the highest score to build an SQL join command. Query engine 326 executes this join command and returns the output response, including the resulting output dataset, join parameters used and the "what-if" list, back to user interface 358. FIG. 15 shows an exemplary output editor 1502 that displays the output response.

Becky decides she needs to join REGIONS with HMOS before it joins with Output_1. She uses the command in the join diagram at allows her to insert a join of REGIONS and HMOS before it joins with Output_1. User interface 358 creates another new join request named Output_3. This request (not shown) has a similar structure to that presented in FIG. 14. Command builder 322 parses the new join request, and generates another list of "what-if" candidate join conditions and their respective scores, sorts them, and uses the candidate join condition with the highest score to build an SQL join command. FIG. 16 shows an exemplary output editor 1602 that displays the output response.

At this point, as shown in FIG. 17a, the output dataset 1702 has the information that Becky desires, but with 11 columns of data, it also contains extra columns that are not relevant for her. So she selects only the four columns she wants in her final dataset. FIG. 17a shows the current output dataset 1702 with four selected columns 1703. For clarity, Becky also renames the columns. FIG. 17b shows the current output dataset 1704 with renamed columns 1705.

Figure 18:
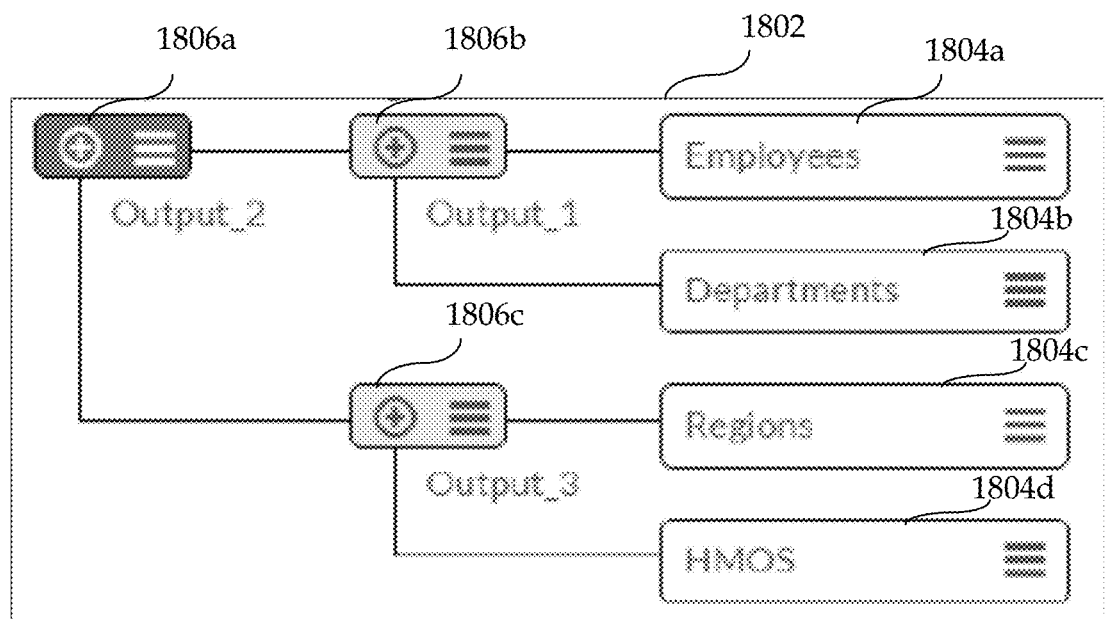
FIG. 18 shows the resulting join diagram.

FIG. 18 shows the resulting join diagram 1802. Becky can click on any node to see the state of the join at that point in the process. If she clicks on the white leaf nodes 1804a-d, she can see the original input tables in the Table Viewer. If she clicks on any of the internal (non-leaf) nodes 1806a-c, she can see the join parameters and the join output result dataset at that location. If she clicks on the root node 1806a, she can see the results of the entire complex join. If she changes the join parameters at any node, the results of any downstream join will be affected and will be displayed when she clicks on any of these downstream join nodes. When Becky is satisfied she has created the complex join with all the correct parameters, she clicks the "Save" UI element, and a final persistent dataset is created.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A method of joining datasets, comprising:
displaying a first user interface view arranged to enable a user to specify input datasets for joining;
displaying a second user interface view arranged to enable the user to specify join parameters for a join condition;
displaying a third user interface view arranged to enable the user to specify output parameters;
sending, to a computer system, a join request including the input datasets, the join parameters and the output parameters;
converting, by the computer system, the join request into a query command based on a query language;
executing, by the computer system, the query command to generate an output dataset;
calculating, by the computer system, a match score for the loin condition of the join request, wherein the match score is based on at least one of the input datasets and the output dataset;

sending, by the computer system, the output dataset and the match score; and displaying the output dataset and the match score.

2. The method of claim 1 wherein displaying the first user interface view comprises displaying a join diagram that includes a binary tree, wherein an internal node of the binary tree represents a join operation between child nodes.

3. The method of claim 1 wherein displaying the second user interface view comprises displaying a join editor arranged to enable the user to specify a join type or a join condition.

4. The method of claim 1 wherein displaying the second user interface view comprises displaying a list of selectable candidate join conditions with respective candidate match scores.

5. The method of claim 1 wherein displaying the third user interface view comprises displaying a list of selectable columns of the input datasets.

6. A system for joining datasets, comprising:
  a non-transitory memory device for storing computer-readable program code; and
  a processor in communication with the memory device, the processor being operative with the computer-readable program code to perform operations, comprising:
    receiving a join request including an identifier for a first input dataset, an identifier for a second input dataset, and one or more join parameters,
    converting the join request into a query command based on a query language,
    executing the query command to generate an output dataset,
    calculating a match score for at least one of the one or more join parameters in the join request based on the output dataset, wherein the match score is a measure of how many records from the first input dataset appear in the output dataset, and
    sending an output response including the output dataset and the match score.

7. The system of claim 6 wherein the processor is operative with the computer-readable program code to perform further operations comprising:
  selecting columns from the first input dataset and second input dataset; and
  building one or more candidate join conditions based on the columns.

8. The system of claim 7 wherein the processor is operative with the computer-readable program code to select the columns by selecting, for each column in the first input dataset, a predetermined number of columns from the second input dataset that has same content type and a range of values that overlaps a range of values of the column in the first input dataset.

9. The system of claim 7 wherein the processor is operative with the computer-readable program code to select the columns by selecting columns with names ending with a predetermined string.

10. The system of claim 7 wherein the processor is operative with the computer-readable program code to select the columns by selecting a first column from the first input dataset and a second column from the second input dataset with names that satisfy a fuzzy match condition to each other.

11. The system of claim 7 wherein the processor is operative with the computer-readable program code to select the columns by selecting a first column from the first input dataset and a second column from the second input dataset with names that satisfy a fuzzy match condition to a name of the first dataset or the second dataset.

12. The system of claim 7 wherein the processor is operative with the computer-readable program code to select the columns by selecting a first column from the first input dataset and a second column from the second input dataset that have previously been used in a join condition.

13. The system of claim 7 wherein the processor is operative with the computer-readable program code to perform a further operation, comprising:
  calculating one or more candidate match scores for the one or more candidate join conditions.

14. The system of claim 13 wherein the processor is operative with the computer-readable program code to calculate the one or more candidate match scores based on one or more join types associated with the one or more candidate join conditions.

15. The system of claim 6 wherein the processor is operative with the computer-readable program code to convert the join request into the query command based on structured query language (SQL).

16. The system of claim 6 wherein the processor is operative with the computer-readable program code to perform additional operations, comprising:
  displaying a first user interface view arranged to enable a user to specify the first and second input datasets; and
  displaying a second user interface view arranged to enable the user to specify the one or more join parameters.

17. The system of claim 16 wherein the processor is operative with the computer-readable program code to display the first user interface view by displaying a join diagram that includes a binary tree, wherein an internal node of the binary tree represents a join operation between child nodes.

18. The system of claim 16 wherein the processor is operative with the computer-readable program code to display the second user interface view by displaying a list of selectable candidate join conditions with respective candidate match scores.

19. The system of claim 6 wherein the processor is operative with the computer-readable program code to further display a third user interface view arranged to enable a user to specify output parameters.

20. A non-transitory computer-readable medium having stored thereon program code, the program code executable by a computer to perform operations comprising:
  receiving, from a user interface, a join request including an identifier for a first input dataset, an identifier for a second input dataset, and one or more join parameters;
  determining a plurality of candidate join conditions for the join request based on the first input dataset, the second input dataset, and the one or more join parameters;
  calculating a plurality of match scores corresponding to the plurality of candidate join conditions, wherein the respective match scores represent the quantity of matched records in the first input dataset and the second input dataset for the respective candidate join conditions;
  sending, to the user interface, the plurality of candidate join conditions and corresponding plurality of match scores for display;
  receiving, from the user interface, a selected join condition from the plurality of candidate join conditions;
  converting the join request into a query command based on a query language and the selected join condition;

executing the query command to generate an output dataset; and sending, to the user interface, an output response including the output dataset for display.

* * * * *